US012618410B2

(12) United States Patent
Mastrocola et al.

(10) Patent No.: US 12,618,410 B2
(45) Date of Patent: *May 5, 2026

(54) FUEL SYSTEM WITH ELECTRIC GENERATOR INTEGRATED BOOST STAGE

(71) Applicant: Hamilton Sundstrand Corporation, Charlotte, NC (US)

(72) Inventors: Naison E. Mastrocola, Goshen, CT (US); Ryan P. Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 132 days.

This patent is subject to a terminal disclaimer.

(21) Appl. No.: 18/614,172

(22) Filed: Mar. 22, 2024

(65) Prior Publication Data

US 2025/0297610 A1 Sep. 25, 2025

(51) Int. Cl.
| | |
|---|---|
| *F04D 13/02* | (2006.01) |
| *B64D 37/34* | (2006.01) |
| *F01D 25/12* | (2006.01) |
| *F01D 25/18* | (2006.01) |
| *F02C 7/14* | (2006.01) |

(Continued)

(52) U.S. Cl.
CPC ............. *F04D 13/02* (2013.01); *B64D 37/34* (2013.01); *F01D 25/12* (2013.01); *F01D 25/18* (2013.01); *F02C 7/14* (2013.01); *F02C 7/22* (2013.01); *F02C 7/224* (2013.01); *F02C 7/232* (2013.01); *F02C 7/236* (2013.01); *F02K 3/10* (2013.01); *F04D 13/06* (2013.01);

(Continued)

(58) Field of Classification Search
CPC .. F02C 7/232; F02C 7/14; F02C 7/224; F02C 7/236; F02C 7/22; Y02T 50/60; F05D 2260/213; F05D 2220/323; F05D 2260/606; F05D 2260/98; F02K 3/10; B64D 37/34; F01D 25/12; F01D 25/18
See application file for complete search history.

(56) References Cited

U.S. PATENT DOCUMENTS

| | | | | | |
|---|---|---|---|---|---|
| 3,259,066 A | * | 7/1966 | Williams | ............. | F02M 37/025 |
| | | | | | 137/565.33 |
| 3,614,269 A | * | 10/1971 | Lanctot | .................. | F02C 7/236 |
| | | | | | 417/427 |

(Continued)

FOREIGN PATENT DOCUMENTS

EP          1700018 B1      7/2013

*Primary Examiner* — Peter J Bertheaud
(74) *Attorney, Agent, or Firm* — Kinney & Lange, P.A.

(57) ABSTRACT

An aircraft fuel system includes a first integrated boost stage having a boost pump configured to receive a fuel flow from a fuel tank via a boost supply line, at least one generator collocated with and operatively connected to the boost pump for driving the boost pump, and a tap fluidly connecting the boost pump and the at least one generator for selectively delivering an amount of the fuel flow to the at least one generator. The fuel system further includes a gearbox operatively connected to the at least one generator, and a main stage downstream of the boost stage and operatively connected to the gearbox. The main stage includes a main pump configured to receive the fuel flow from the boost pump along a main supply line, and a filter disposed along the main supply line upstream of the main pump for filtering the fuel flow.

20 Claims, 2 Drawing Sheets

(51) Int. Cl.

| | |
|---|---|
| *F02C 7/22* | (2006.01) |
| *F02C 7/224* | (2006.01) |
| *F02C 7/232* | (2006.01) |
| *F02C 7/236* | (2006.01) |
| *F02K 3/10* | (2006.01) |
| *F04D 13/06* | (2006.01) |

(52) U.S. Cl.

CPC .. *F05D 2220/323* (2013.01); *F05D 2260/213* (2013.01); *F05D 2260/98* (2013.01); *Y02T 50/60* (2013.01)

(56)             References Cited

U.S. PATENT DOCUMENTS

| | | | | |
|---|---|---|---|---|
| 4,776,536 A * | 10/1988 | Hudson | ............... | B64D 37/34 |
| | | | | 244/135 R |
| 6,182,435 B1 * | 2/2001 | Niggemann | ............ | F01D 25/12 |
| | | | | 60/730 |
| 6,584,762 B2 * | 7/2003 | Snow | ........................ | F02K 3/10 |
| | | | | 60/204 |
| 7,185,485 B2 * | 3/2007 | Lewis | ..................... | F02C 9/263 |
| | | | | 60/764 |
| 8,261,527 B1 * | 9/2012 | Stearns | ..................... | F02C 7/06 |
| | | | | 60/39.83 |
| 10,107,198 B2 * | 10/2018 | Stearns | ................... | F02C 7/224 |
| 11,236,682 B2 | 2/2022 | Veilleux et al. | | |
| 11,781,484 B2 * | 10/2023 | Cocks | ........................ | F02C 9/28 |
| | | | | 60/772 |
| 2025/0297574 A1 * | 9/2025 | Mastrocola | ............ | F02C 7/222 |

* cited by examiner

FUEL SYSTEM WITH ELECTRIC GENERATOR INTEGRATED BOOST STAGE

BACKGROUND

The present disclosure relates generally to a fuel system, and more particularly to an aircraft fuel system.

Aircraft fuel systems can include multiple pumps, including one or more primary or main/motive pumps and one or more boost pumps for increasing the pressure of fuel delivered to the primary pumps. The boost stage of such fuel systems can benefit from a second accessory drive pad to run the boost pumps at a different speed from the main pumps, as the ideal operating speeds of each type of pump can vary by several thousand RPMs in some examples. However, the cost and weight of an additional gear centerline and housing detracts from the benefits. As such, alternative means for operating boost pumps and main pumps at their optimal respective speeds are desirable.

SUMMARY

An aircraft fuel system includes a first integrated boost stage having a boost pump configured to receive a fuel flow from a fuel tank via a boost supply line, at least one generator collocated with and operatively connected to the boost pump for driving the boost pump, and a tap fluidly connecting the boost pump and the at least one generator for selectively delivering an amount of the fuel flow to the at least one generator. The fuel system further includes a gearbox operatively connected to the at least one generator, and a main stage downstream of the boost stage and operatively connected to the gearbox. The main stage includes a main pump configured to receive the fuel flow from the boost pump along a main supply line, and a filter disposed along the main supply line upstream of the main pump for filtering the fuel flow.

An aircraft fuel system includes at least one integrated boost stage having a boost pump configured to receive a fuel flow from a fuel tank via a boost supply line, at least one permanent magnet machine collocated with and operatively connected to the boost pump for driving the boost pump, and a tap fluidly connecting the boost pump and the at least one permanent magnet machine for selectively delivering an amount of the fuel flow to the at least one permanent magnet machine. The fuel system further includes a gearbox operatively connected to the at least one permanent magnet machine, and a main stage downstream of the boost stage and operatively connected to the gearbox. The main stage includes a main pump configured to receive the fuel flow from the boost pump along a main supply line, and a filter disposed along the main supply line upstream of the main pump for filtering the fuel flow.

Figure 1:
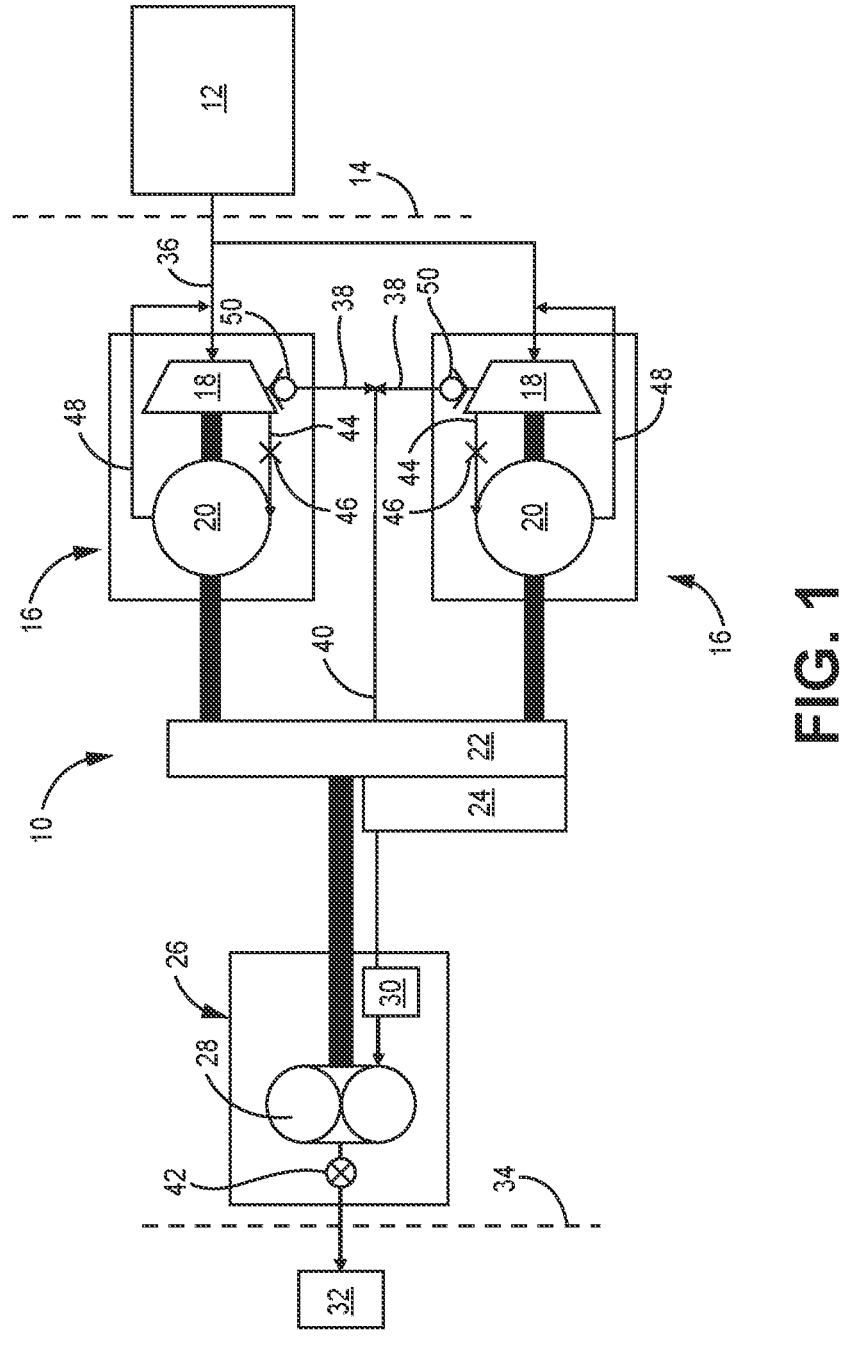
FIG. 1 is a schematic illustration of an aircraft fuel system with integrated boost stages according to a first embodiment.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

This disclosure presents fuel systems with integrated boost stages. More specifically, one or more boost pumps can be collocated with the engine generators to operate independently of the main fuel pump and further to provide a cooling/lubricating fuel flow to the generators.

FIG. 1 is a schematic illustration of a portion of fuel system 10 for an aircraft. As shown in FIG. 1, fuel system 10 can include at least one fuel tank 12 which can be located within a fuselage or wing of aircraft 14, and integrated boost stages 16, each including a boost pump 18 and generator 20. Boost pumps 18 can be centrifugal pumps, and generators 20 can be integrated direct drive generators in an exemplary embodiment. System 10 can further include gearbox 22, heat exchanger 24, and main stage 26 including main pump 28 and fuel filter 30 for providing filtered fuel to, component(s) 32 of engine 34 which can be, in one example, combustor nozzles. Main pump 28 can be a positive displacement pump, such as a gear pump, in an exemplary embodiment, while heat exchanger 24 can be a fuel engine oil cooler. As schematically represented in FIG. 1, integrated boost stages 16, gearbox 22, heat exchanger 24, and main stage 26 can be physically and mechanically coupled to engine 34.

In operation of fuel system 10, fuel can be urged/drawn from fuel tank 12 by boost pumps 18 along boost supply line 36 which can be branched to provide fuel to n number of boost pumps 18 of m number of boost stages 16, although two are depicted in FIG. 1. Each boost pump 18 and respective generator 20 can be operatively coupled to gearbox 22 by a common shaft. Boost pumps 18 can raise the pressure of the fuel flow for delivery to main pump 28 via boost outlet lines 38, then main supply line 40. Fuel filter 30 can be disposed along main supply line 40 upstream of main pump 28 to filter the fuel flow being delivered to component 32. Metering valve 42 can control the fuel flow from main pump 18 to component 32. Within each integrated boost stage 16, tap 44 can be configured to supply an amount of the primary fuel flow to generator 20 to cool and lubricate generator 20. As such, tap 44 can fluidly connect boost pump 18 to a housing of generator 20. Orifice 46 can be disposed along tap 44 to regulate the cooling fuel flow to generator 20. Fuel that has circulated through generator 20 can be returned to boost supply line 36 via generator outlet line 48. Fuel flowing through tap 44 can therefore be relatively cooler than fuel flowing through generator outlet line 48, as heat from generator 20 heat can be rejected to the fuel. As stated above, most of the fuel flow (i.e., the non-tapped fuel flow) can exit each boost pump 18 via respective boost outlet lines 38. Check valve 50 disposed along each boost outlet line 38 prevents backflow into respective boost pumps 18.

Integrated boost stages 16 can be controlled, for example, by the electronic engine controller (EEC) or other type of controller. Various sensors (e.g., pressure and temperature sensors) can be in communication with boost stages 16 in some embodiments to provide feedback to the controller. This can include the selective delivery of cooling fuel flow to generators 20 based on cooling and/or lubrication needs. Control of boost stages 16 can include independent operation of one or both boost stages 16. In some cases, this can include the failure of one or more components of a boost stage 16 requiring it to temporarily shut down. The redundant design allows for uninterrupted fuel flow to main stage 26.

Figure 2:
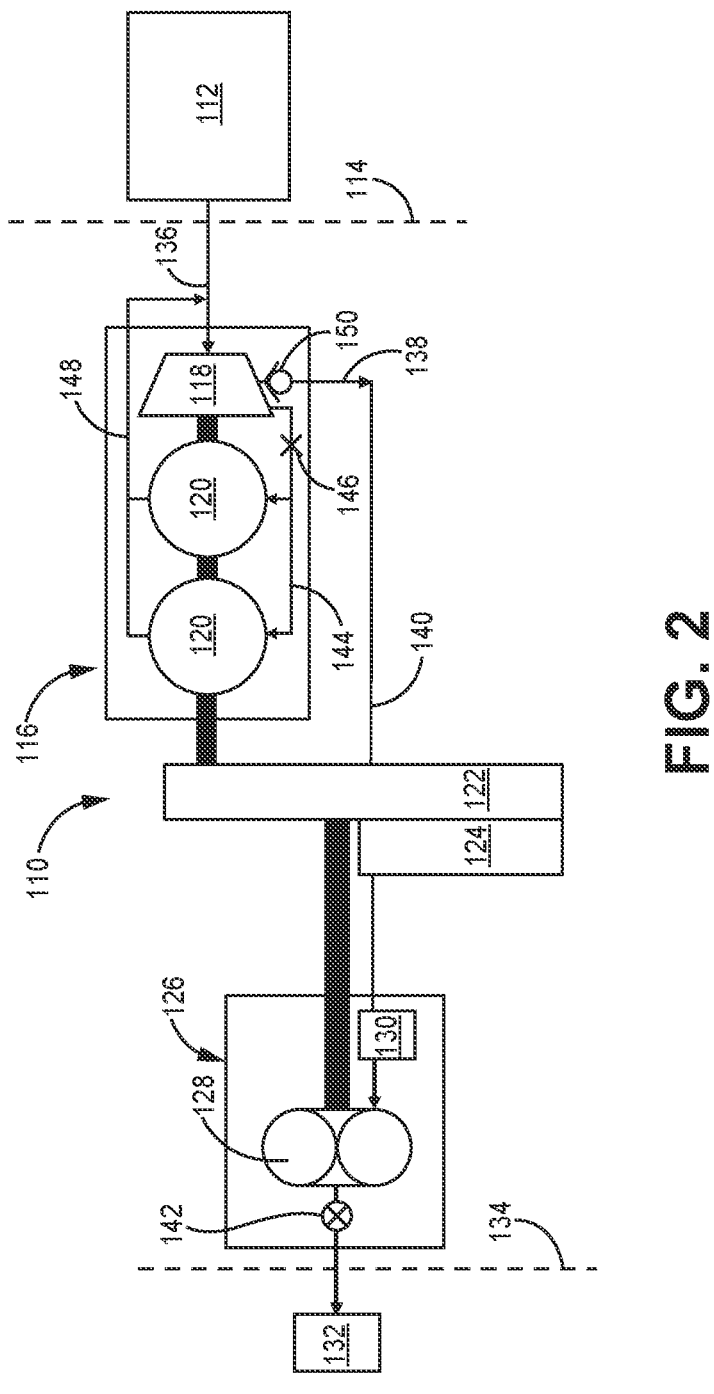
FIG. 2 is a schematic illustration of an aircraft fuel system with an integrated boost stage according to a second embodiment.

FIG. 2 is a schematic illustration of a portion of fuel system 110 for aircraft 114 which is similar to fuel system 10 in the number and type of its constituents, except that it includes a single integrated boost stage 116 with differences discussed in greater detail below. More specifically, system 110 includes along the fuel flow pathway at least one fuel tank 112, integrated boost stage 116, gearbox 122, heat exchanger 124, and main stage 126 for providing the flow of fuel to component(s) 132 within engine 134. Main stage can include filter 130 for filtering the flow of fuel provided to main pump 128, and metering valve 142 for regulating the flow of fuel from main pump 128 to component(s) 132. Integrated boost stage 116 includes boost pump 118 for drawing fuel from fuel tank 112 along boost supply line 136. Unlike system 10, integrated boost stage 116 can include two permanent magnet machines 120 mechanically coupled to boost pump 118 and gearbox 122. Permanent magnet machines 120 can be either permanent magnet alternators (PMAs) or permanent magnet generators (PMGs). Such embodiment advantageously allows boost pump 118 to operate with either permanent magnet machine 120 and thus provides operational redundancy without requiring a separate boost pump 118 and/or boost stage 116. This may be preferable where reduction in weight and/or fuel system footprint are priorities. Similar to fuel system 10, an amount of the fuel flow can be diverted along tap 144 to cool and lubricate permanent magnet machines 120. Orifice 146 can be disposed along tap 144 to regulate this cooling fuel flow. Fuel circulated through permanent magnet machines 120 can be returned to boost supply line 136 via permanent magnet machine outlet line 148. The majority of the fuel flow received by boost pump 116 can be delivered to main stage 126 along main supply line 140 via boost outlet line 138. Check valve 150 can be disposed along boost outlet line 138 for preventing backflow into boost pump 118.

Fuel systems 10, 110 with integrated boost stages 16,116 have several benefits over legacy systems. First, rotational speeds of main pumps 28, 128 are decoupled from those of boost pumps 18, 118, as boost pumps 16, 116 are coupled to generators/machines 20, 120 rather than sharing an accessory drive pad with main pumps 18, 118. It is worth noting that this is done without the additional cost and weight of adding a drive pad and dedicated housing for boost pumps 16, 116. Further, the use of an amount of tapped fuel flow for cooling and lubrication of generators/machines 20, 120 meets operational requirements and allows for the reduction in size and/or elimination of dedicated oil systems to cool and lubricate generators/machines 20, 120, which can reduce both cost and weight of fuel systems 10, 110.

It should be understood that various other embodiments of fuel systems 10, 110 are possible. For example, fuel systems 10, 110 can include other features (e.g., valves, pumps, controllers, etc.) not shown in the figures. The disclosed fuel systems can be implemented in engines used in both military and commercial aircraft.

Discussion of Possible Embodiments

The following are non-exclusive descriptions of possible embodiments of the present invention.

An aircraft fuel system includes a first integrated boost stage having a boost pump configured to receive a fuel flow from a fuel tank via a boost supply line, at least one generator collocated with and operatively connected to the boost pump for driving the boost pump, and a tap fluidly connecting the boost pump and the at least one generator for selectively delivering an amount of the fuel flow to the at least one generator. The fuel system further includes a gearbox operatively connected to the at least one generator, and a main stage downstream of the boost stage and operatively connected to the gearbox. The main stage includes a main pump configured to receive the fuel flow from the boost pump along a main supply line.

The fuel system of the preceding paragraph can optionally include, additionally and/or alternatively, any one or more of the following features, configurations and/or additional components:

The above fuel system can further include a second integrated boost stage having a boost pump configured to receive a fuel flow from a fuel tank via a boost supply line, at least one generator collocated with and operatively connected to the boost pump for driving the boost pump, and a tap fluidly connecting the boost pump and the at least one generator for selectively delivering an amount of the fuel flow to the at least one generator.

In any of the above fuel systems, the boost pump of each of the first and second integrated boost stages can be a centrifugal pump.

In any of the above fuel systems, the at least one generator of each of the first and second integrated boost stages can be a direct drive generator.

In any of the above fuel systems, the main pump can be a positive displacement pump.

Any of the above fuel systems can further include a boost outlet line fluidly coupling each boost pump of the first and second integrated boost stages to the main supply line, and a check valve disposed along the boost outlet line.

Any of the above fuel systems can further include a generator outlet line fluidly coupling the at least one generator of each of the first and second integrated boost stages to the boost supply line to return a circulated amount of the fuel flow through the at least one generator to the boost supply line.

Any of the above fuel systems can further include an orifice disposed along the tap of each of the first and second integrated boost stages.

Any of the above fuel systems can further include a heat exchanger upstream of the main stage.

In any of the above fuel systems, the main stage can further include a filter disposed along the main supply line upstream of the main pump for filtering the fuel flow.

In any of the above fuel systems, the main stage can further include a metering valve downstream of the main pump.

An aircraft fuel system includes at least one integrated boost stage having a boost pump configured to receive a fuel flow from a fuel tank via a boost supply line, at least one permanent magnet machine collocated with and operatively connected to the boost pump for driving the boost pump, and a tap fluidly connecting the boost pump and the at least one permanent magnet machine for selectively delivering an amount of the fuel flow to the at least one permanent magnet machine. The fuel system further includes a gearbox operatively connected to the at least one permanent magnet machine, and a main stage downstream of the boost stage and operatively connected to the gearbox. The main stage includes a main pump configured to receive the fuel flow from the boost pump along a main supply line.

The fuel system of the preceding paragraph can optionally include, additionally and/or alternatively, any one or more of the following features, configurations and/or additional components:

In the above fuel system, the at least one permanent magnet machine can include two permanent magnet machines.

In any of the above fuel systems, each of the permanent magnet machines can be one of a permanent magnet alternator and a permanent magnet generator.

Any of the above fuel systems can further include a boost outlet line fluidly coupling the boost pump to the main supply line.

Any of the above fuel systems can further include a permanent magnet machine outlet line fluidly coupling each permanent magnet machine to the boost supply line to return a circulated amount of the fuel flow through each permanent magnet machine to the boost supply line.

Any of the above fuel systems can further include an orifice disposed along the tap.

Any of the above fuel systems can further include a heat exchanger upstream of the main stage.

In any of the above fuel systems, the main stage can further include a filter disposed along the main supply line upstream of the main pump for filtering the fuel flow.

In any of the above fuel systems, the main stage can further include a metering valve downstream of the main pump.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft fuel system comprising:
a first integrated boost stage comprising:
 a boost pump configured to receive a fuel flow from a fuel tank via a boost supply line;
 at least one generator collocated with and operatively connected to the boost pump for driving the boost pump; and
 a tap fluidly connecting the boost pump and the at least one generator for selectively delivering an amount of the fuel flow to the at least one generator;
a gearbox operatively connected to the at least one generator; and
a main stage downstream of the boost stage and operatively connected to the gearbox, the main stage comprising a main pump configured to receive the fuel flow from the boost pump along a main supply line.

2. The fuel system of claim 1 and further comprising:
a second integrated boost stage comprising:
 a boost pump configured to receive a fuel flow from a fuel tank via the boost supply line;
 at least one generator collocated with and operatively connected to the boost pump for driving the boost pump; and
 a tap fluidly connecting the boost pump and the at least one generator for selectively delivering an amount of the fuel flow to the at least one generator.

3. The fuel system of claim 2, wherein the boost pump of each of the first and second integrated boost stages is a centrifugal pump.

4. The fuel system of claim 2, wherein the at least one generator of each of the first and second integrated boost stages is a direct drive generator.

5. The fuel system of claim 2, wherein the main pump is a positive displacement pump.

6. The fuel system of claim 2 and further comprising:
a boost outlet line fluidly coupling each boost pump of the first and second integrated boost stages to the main supply line; and
a check valve disposed along the boost outlet line.

7. The fuel system of claim 2 and further comprising: a generator outlet line fluidly coupling the at least one generator of each of the first and second integrated boost stages to the boost supply line to return a circulated amount of the fuel flow through the at least one generator to the boost supply line.

8. The fuel system of claim 2 and further comprising: an orifice disposed along the tap of each of the first and second integrated boost stages.

9. The fuel system of claim 2 and further comprising: a heat exchanger upstream of the main stage.

10. The fuel system of claim 2, wherein the main stage further comprises: a filter disposed along the main supply line upstream of the main pump for filtering the fuel flow.

11. The fuel system of claim 2, wherein the main stage further comprises: a metering valve downstream of the main pump.

12. An aircraft fuel system comprising:
an integrated boost stage comprising:
 a boost pump configured to receive a fuel flow from a fuel tank via a boost supply line;
 at least one permanent magnet machine collocated with and operatively connected to the boost pump for driving the boost pump; and
 a tap fluidly connecting the boost pump and the at least one permanent magnet machine for selectively delivering an amount of the fuel flow to the at least one permanent magnet machine;
a gearbox operatively connected to the at least one permanent magnet machine; and
a main stage downstream of the boost stage and operatively connected to the gearbox, the main stage comprising a main pump configured to receive the fuel flow from the boost pump along a main supply line.

13. The fuel system of claim 12, wherein the at least one permanent magnet machine comprises two permanent magnet machines.

14. The fuel system of claim 13, wherein each of the permanent magnet machines is one of a permanent magnet alternator and a permanent magnet generator.

15. The fuel system of claim 13 and further comprising: a boost outlet line fluidly coupling the boost pump to the main supply line.

16. The fuel system of claim 13 and further comprising: a permanent magnet machine outlet line fluidly coupling each permanent magnet machine to the boost supply line to return a circulated amount of the fuel flow through each permanent magnet machine to the boost supply line.

17. The fuel system of claim 13 and further comprising: an orifice disposed along the tap.

18. The fuel system of claim 13 and further comprising: a heat exchanger upstream of the main stage.

19. The fuel system of claim 13, wherein the main stage further comprises: a filter disposed along the main supply line upstream of the main pump for filtering the fuel flow.

20. The fuel system of claim 13, wherein the main stage further comprises: a metering valve downstream of the main pump.

\*   \*   \*   \*   \*